United States Patent
Cao et al.

(10) Patent No.: US 12,322,960 B2
(45) Date of Patent: Jun. 3, 2025

(54) SYSTEM AND METHOD FOR CONTROLLING DIRECT CURRENT BUS VOLTAGE

(71) Applicant: Huawei Digital Power Technologies Co., Ltd., Shenzhen (CN)

(72) Inventors: Yuanzheng Cao, Shenzhen (CN); Lin Li, Shanghai (CN); Haibin Guo, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/398,776

(22) Filed: Dec. 28, 2023

(65) Prior Publication Data

US 2024/0128745 A1  Apr. 18, 2024

Related U.S. Application Data

(63) Continuation of application No. PCT/CN2021/103500, filed on Jun. 30, 2021.

(51) Int. Cl.
  *H02J 3/38*  (2006.01)
  *H02J 1/06*  (2006.01)
  *H02J 3/00*  (2006.01)

(52) U.S. Cl.
  CPC ............... *H02J 1/06* (2013.01); *H02J 3/001* (2020.01); *H02J 3/388* (2020.01); *H02J 2300/24* (2020.01); *Y02E 10/56* (2013.01)

(58) Field of Classification Search
  CPC .... H02J 1/06; H02J 3/001; H02J 3/388; H02J 2300/24; H02J 3/381; Y02E 10/56
  See application file for complete search history.

(56) References Cited

U.S. PATENT DOCUMENTS

| | | | |
|---|---|---|---|
| 2011/0261601 A1* | 10/2011 | Chapman | H02J 3/40 363/131 |
| 2018/0166883 A1* | 6/2018 | Xin | H02J 3/00125 |
| 2019/0109461 A1* | 4/2019 | Khajehoddin | H02M 1/42 |

FOREIGN PATENT DOCUMENTS

| | | |
|---|---|---|
| CN | 105720604 B | 8/2018 |
| CN | 106921146 B | 9/2019 |
| WO | 2019223785 A1 | 11/2019 |

* cited by examiner

*Primary Examiner* — Rexford N Barnie
*Assistant Examiner* — Thai H Tran
(74) *Attorney, Agent, or Firm* — Maier & Maier, PLLC

(57) ABSTRACT

A system for controlling a direct current bus voltage includes a controller and an inverter. The controller is configured to: obtain a power grid voltage; obtain a maximum sampling value of a direct current bus voltage of the inverter when the power grid voltage jumps, where the maximum sampling value of the direct current bus voltage is a maximum voltage value on the direct current bus in a time period for detecting a power grid voltage jump; obtain a first direct current bus voltage reference value based on the maximum sampling value of the direct current bus voltage; and obtain a second direct current bus voltage reference value based on the first direct current bus voltage reference value and a preset first rising gradient value, to limit a rising rate of the direct current bus voltage.

20 Claims, 4 Drawing Sheets

SYSTEM AND METHOD FOR CONTROLLING DIRECT CURRENT BUS VOLTAGE

CROSS-REFERENCE TO RELATED APPLICATIONS

This application is a continuation of International Application No. PCT/CN2021/103500, filed on Jun. 30, 2021, the disclosure of which is hereby incorporated by reference in its entirety.

TECHNICAL FIELD

Embodiments relate to the field of power supply technologies, and to a system and method for controlling a direct current bus voltage.

BACKGROUND

An inverter may be separately connected to a power grid and a load device. For example, the inverter may be a photovoltaic grid-connected inverter. An output end of the inverter is directly connected to the power grid through a common connection point, and another load device may be connected to the output end. After the output end is connected to the power grid, a port voltage of the output end is clamped by the power grid, and a port voltage amplitude is determined by a power grid voltage.

When high voltage ride through occurs, a switch on a power grid side is turned on, and a direct current bus (BUS) voltage needs to be controlled. When a power grid disconnection operation is performed, the switch on the power grid side is turned off, and the direct current bus voltage also needs to be controlled.

Currently, a solution for controlling a direct current bus voltage is applicable only to a high voltage ride through scenario, or is applicable only to a power grid disconnection operation scenario. In other words, the current solution for controlling a direct current bus voltage cannot be applicable to both the foregoing two scenarios. However, how to control a direct current bus voltage in a case in which two scenarios of high voltage ride through and a power grid disconnection operation moment are compatible is an urgent problem to be resolved.

SUMMARY

Embodiments provide a system and method for controlling a direct current bus voltage, to control a direct current bus voltage in a case in which two scenarios of high voltage ride through and a power grid disconnection operation moment are compatible, and control the direct current bus voltage in a proper range.

To resolve the foregoing problem, embodiments provide the following solutions.

According to a first aspect, an embodiment provides a system for controlling a direct current bus voltage, including a controller and an inverter.

An output end of the inverter is connected to a power grid, and an input end of the inverter is connected to a photovoltaic module through a direct current bus.

The controller is configured to: obtain a power grid voltage;

obtain a maximum sampling value of a direct current bus voltage of the inverter when the power grid voltage jumps, where the maximum sampling value of the direct current bus voltage is a maximum voltage value on the direct current bus in a time period for detecting a power grid voltage jump;

obtain a first direct current bus voltage reference value based on the maximum sampling value of the direct current bus voltage, where the first direct current bus voltage reference value is greater than or equal to the maximum sampling value of the direct current bus voltage; and obtain a second direct current bus voltage reference value based on the first direct current bus voltage reference value and a preset first rising gradient value, to limit a rising rate of the direct current bus voltage.

In the foregoing solution, if high voltage ride through (HVRT) occurs in the inverter, a direct current bus voltage raised by a power grid backflow in the time period for detecting the power grid voltage jump is sufficient to support subsequent HVRT power output. If the inverter is disconnected from the power grid, the second direct current bus voltage reference value is obtained based on the first direct current bus voltage reference value and the preset first rising gradient value. In this embodiment, the rising rate of the direct current bus voltage can be limited by using the preset first rising gradient value, so that a rising amount of the direct current bus voltage is reduced in the time period for detecting the power grid voltage jump. Therefore, embodiments can be compatible with two scenarios: high voltage ride through and a power grid disconnection operation moment, to control the direct current bus voltage.

In a possible implementation, the controller is further configured to obtain a third direct current bus voltage reference value based on the second direct current bus voltage reference value and a preset second rising gradient value, where the second rising gradient value is less than the first rising gradient value. A rising gradient of the direct current bus voltage reference value is reduced from the first rising gradient value to the second rising gradient value. By reducing the rising gradient of the direct current bus voltage reference value, the rising rate of the direct current bus voltage can be limited, so that the rising amount of the direct current bus voltage is reduced in the time period for detecting the power grid voltage jump. Therefore, embodiments can be compatible with two scenarios: the high voltage ride through and the power grid disconnection operation moment, to control the direct current bus voltage.

In a possible implementation, the controller is further configured to adjust the maximum sampling value of the direct current bus voltage based on a preset voltage amplitude threshold, to obtain the first direct current bus voltage reference value. In the foregoing solution, in this embodiment, the controller may quickly increase the maximum sampling value of the direct current bus voltage when the power grid voltage jumps, to obtain the first direct current bus voltage reference value, so that the direct current bus voltage can be quickly increased.

In a possible implementation, the controller is further configured to obtain the first direct current bus voltage reference value in the following manner $U_{BUS-R}=U_{BUS-MAX}+\Delta U$, where $U_{BUS-R}$ represents the first direct current bus voltage reference value, $U_{BUS-MAX}$ represents the maximum sampling value of the direct current bus voltage, and $\Delta U$ represents the voltage amplitude threshold. In the foregoing solution, the controller may quickly increase the maximum sampling value of the direct current bus voltage when the power grid voltage jumps, to obtain the first direct current bus voltage reference value, so that the direct current bus voltage can be quickly increased.

In a possible implementation, the controller is further configured to determine the voltage amplitude threshold based on a direct current bus voltage value that needs to be used when the inverter performs high voltage ride through. In the foregoing solution, the voltage amplitude threshold may be used to adjust the maximum sampling value of the direct current bus voltage to obtain the first direct current bus voltage reference value. The voltage amplitude threshold is determined based on the direct current bus voltage value that needs to be used when the inverter performs high voltage ride through. If the maximum sampling value of the direct current bus voltage cannot meet the direct current bus voltage value that needs to be used when the inverter performs high voltage ride through, the voltage amplitude threshold needs to be set to a large value. If the maximum sampling value of the direct current bus voltage can meet or approaches the direct current bus voltage value that needs to be used when the inverter performs high voltage ride through, the voltage amplitude threshold needs to be set to a small value or zero.

In a possible implementation, the voltage amplitude threshold is a voltage value greater than or equal to 0. In the foregoing solution, the voltage amplitude threshold may be represented as $\Delta U$, and a value of $\Delta U$ may be greater than or equal to 0. For example, it needs to be ensured that a raised direct current bus voltage reference value can meet the voltage value that needs to be used during HVRT. After a normal power grid voltage jumps, bus voltage backflow occurs for a short time, for example, energy of the power grid is backflowed to the direct current bus, causing a passive rise of the bus voltage. In a case in which an actual value of the passively raised bus voltage is sufficient for HVRT use, a value of $\Delta U$ is set. In this case, $\Delta U$ is equal to 0. If the maximum sampling value of the direct current bus voltage is not sufficient for the voltage value used during HVRT, $\Delta U$ needs to be greater than 0, so that the direct current bus voltage reference value can meet the voltage value used during HVRT. A specific value of $\Delta U$ is not limited herein.

In a possible implementation, after obtaining the second direct current bus voltage reference value based on the first direct current bus voltage reference value and the preset first rising gradient value, the controller is further configured to perform a power grid disconnection operation on the inverter when the inverter meets a power grid disconnection feature. In the foregoing solution, the controller may further detect whether the inverter meets the power grid disconnection feature. When the inverter meets the power grid disconnection feature, the controller performs the power grid disconnection operation on the inverter. Therefore, this solution is applicable to a power grid disconnection scenario of the inverter. The power grid disconnection feature may include: a peak value of the power grid voltage is high, a power grid frequency fluctuates, and continuous over-modulation occurs.

In a possible implementation, after performing the power grid disconnection operation on the inverter, the controller is further configured to: when the inverter meets a preset shutdown protection condition, control the inverter to shut down. In the foregoing solution, the shutdown protection condition refers to a determining condition of whether the inverter needs to be shut down for protection. After the controller performs the power grid disconnection operation on the inverter, the controller may determine whether the inverter meets the shutdown protection condition. When the inverter meets the preset shutdown protection condition, the inverter is shut down for protection. In this case, the inverter is shut down under the control of the controller and stops running.

In a possible implementation, after performing the power grid disconnection operation on the inverter, the controller is further configured to: when the inverter does not meet a shutdown protection condition, trigger a step of re-obtaining a power grid voltage. In the foregoing solution, the shutdown protection condition refers to a determining condition of whether the inverter needs to be shut down for protection. After the controller performs the power grid disconnection operation on the inverter, the controller may determine whether the inverter meets the shutdown protection condition. When the inverter does not meet the shutdown protection condition, the step of determining whether the power grid voltage jumps is performed again.

In a possible implementation, the first rising gradient value is $a_1$ V/ms, and V/ms indicates that a unit of a rising gradient value is volts per millisecond. In the foregoing solution, a value of $a_1$ may be reduced, to limit the rising rate of the direct current bus voltage, so that the rising amount of the direct current bus voltage is reduced in the time period for detecting the power grid voltage jump. Therefore, embodiments can be compatible with two scenarios: the high voltage ride through and the power grid disconnection operation moment, to control the direct current bus voltage.

In a possible implementation, $a_1$ satisfies the following relationship: $b<a_1<y/x$, where b represents a saturation speed used to control a direct current bus voltage reference value, y represents a maximum allowable amplitude of the direct current bus voltage, and x represents protection time required for switching overvoltage. In the foregoing solution, the rising gradient value of the direct current bus voltage reference value may be represented as a. For example, a may have a plurality of values such as $a_1$. A value of the rising gradient a V/ms may be set based on a bus voltage reference calculation module in the controller. The bus voltage reference calculation module includes a saturation speed of the controller. It is assumed that a saturation speed of a controller (for example, a PI regulator) of the bus voltage reference calculation module is b V/ms, and protection time required for switching overvoltage is x ms. In this time period, the maximum allowable rising amplitude of the bus voltage is y V, and the value of a satisfies the following relationship: $b<a<y/x$. Therefore, the value of a may be determined according to the foregoing relationship.

In a possible implementation, the controller is further configured to: separately obtain a peak value of the power grid voltage and a valid value of the power grid voltage; and determine, based on the peak value of the power grid voltage and the valid value of the power grid voltage, whether the power grid voltage jumps. In the foregoing solution, the controller may include a sampling circuit, and a power grid voltage sampling value is obtained by using the sampling circuit, so that the peak value of the power grid voltage and the valid value of the power grid voltage can be calculated, and finally whether the power grid voltage jumps is determined based on the peak value and the valid value that are obtained through calculation, to determine whether the power grid voltage jumps.

In a possible implementation, after obtaining the second direct current bus voltage reference value based on the first direct current bus voltage reference value and the preset first rising gradient value, the controller is further configured to: when the inverter meets a high voltage ride through feature, control output power of the inverter to increase. In the foregoing solution, when a power grid voltage jump is detected, a maximum sampling value of the bus voltage in Tres is calculated, and ΔU is added as a bus voltage reference value. If HVRT occurs, a bus voltage raised by the power grid backflow in Tres is sufficient to support subsequent HVRT power output. If the power grid is disconnected, a rising amount of the bus voltage in Tres is still in a proper range, for example, the proper range is that the bus voltage does not reach an overvoltage point. The bus voltage reference value is first increased to ensure functional output, and then a feature is determined to identify HVRT. Feature determining is identifying a power grid disconnection feature or an HVRT feature. For example, feature identification may be obtaining features such as a power grid voltage, a power grid frequency, and a modulation ratio. A feature of the inverter that needs to be obtained is not limited in this embodiment.

According to a second aspect, an embodiment provides a method for controlling a direct current bus voltage, including: obtaining a power grid voltage, where an output end of an inverter is connected to a power grid, and an input end of the inverter is connected to a photovoltaic module through a direct current bus; obtaining a maximum sampling value of a direct current bus voltage of the inverter when the power grid voltage jumps, where the maximum sampling value of the direct current bus voltage is a maximum voltage value on the direct current bus in a time period for detecting a power grid voltage jump; obtaining a first direct current bus voltage reference value based on the maximum sampling value of the direct current bus voltage, where the direct current bus voltage reference value is greater than or equal to the maximum sampling value of the direct current bus voltage; and obtaining a second direct current bus voltage reference value based on the first direct current bus voltage reference value and a preset first rising gradient value, to limit a rising rate of the direct current bus voltage.

In the foregoing solution, if high voltage ride through (HVRT) occurs in the inverter, a direct current bus voltage raised by a power grid backflow in the time period for detecting the power grid voltage jump is sufficient to support subsequent HVRT power output. If the inverter is disconnected from the power grid, the second direct current bus voltage reference value is obtained based on the first direct current bus voltage reference value and the preset first rising gradient value. In this embodiment, the rising rate of the direct current bus voltage can be limited by using the preset first rising gradient value, so that a rising amount of the direct current bus voltage is reduced in the time period for detecting the power grid voltage jump. Therefore, embodiments can be compatible with two scenarios: high voltage ride through and a power grid disconnection operation moment, to control the direct current bus voltage.

In a possible implementation, the method further includes: obtaining a third direct current bus voltage reference value based on the second direct current bus voltage reference value and a preset second rising gradient value, where the second rising gradient value is less than the first rising gradient value. A rising gradient of the direct current bus voltage reference value is reduced from the first rising gradient value to the second rising gradient value. By reducing the rising gradient of the direct current bus voltage reference value, the rising rate of the direct current bus voltage can be limited, so that the rising amount of the direct current bus voltage is reduced in the time period for detecting the power grid voltage jump. Therefore, embodiments can be compatible with two scenarios: the high voltage ride through and the power grid disconnection operation moment, to control the direct current bus voltage.

In a possible implementation, the obtaining a first direct current bus voltage reference value based on the maximum sampling value of the direct current bus voltage includes: adjusting the maximum sampling value of the direct current bus voltage based on a preset voltage amplitude threshold, to obtain the first direct current bus voltage reference value. In the foregoing solution, in this embodiment, the controller may quickly increase the maximum sampling value of the direct current bus voltage when the power grid voltage jumps, to obtain the first direct current bus voltage reference value, so that the direct current bus voltage can be quickly increased.

In a possible implementation, the adjusting the maximum sampling value of the direct current bus voltage based on a preset voltage amplitude threshold, to obtain the first direct current bus voltage reference value includes: obtaining the first direct current bus voltage reference value in the following manner $U_{BUS-R}=U_{BUS-MAX}+\Delta U$, where $U_{BUS-R}$ represents the first direct current bus voltage reference value, $U_{BUS-MAX}$ represents the maximum sampling value of the direct current bus voltage, and ΔU represents the voltage amplitude threshold. In the foregoing solution, the controller may quickly increase the maximum sampling value of the direct current bus voltage when the power grid voltage jumps, to obtain the first direct current bus voltage reference value, so that the direct current bus voltage can be quickly increased.

In a possible implementation, the method further includes: determining the voltage amplitude threshold based on a direct current bus voltage value that needs to be used when the inverter performs high voltage ride through. In the foregoing solution, the voltage amplitude threshold may be used to adjust the maximum sampling value of the direct current bus voltage to obtain the first direct current bus voltage reference value. The voltage amplitude threshold is determined based on the direct current bus voltage value that needs to be used when the inverter performs high voltage ride through. If the maximum sampling value of the direct current bus voltage cannot meet the direct current bus voltage value that needs to be used when the inverter performs high voltage ride through, the voltage amplitude threshold needs to be set to a large value. If the maximum sampling value of the direct current bus voltage can meet or approaches the direct current bus voltage value that needs to be used when the inverter performs high voltage ride through, the voltage amplitude threshold needs to be set to a small value or zero.

In a possible implementation, the voltage amplitude threshold is a voltage value greater than or equal to 0. In the foregoing solution, the voltage amplitude threshold may be represented as ΔU, and a value of ΔU may be greater than or equal to 0. For example, it needs to be ensured that a raised direct current bus voltage reference value can meet the voltage value that needs to be used during HVRT. After a normal power grid voltage jumps, bus voltage backflow occurs for a short time, for example, energy of the power grid is backflowed to the direct current bus, causing a passive rise of the bus voltage. In a case in which an actual value of the passively raised bus voltage is sufficient for HVRT use, a value of ΔU is set. In this case, ΔU is equal to 0. If the maximum sampling value of the direct current bus voltage is not sufficient for the voltage value used during HVRT, ΔU needs to be greater than 0, so that the direct current bus voltage reference value can meet the voltage value used during HVRT. A specific value of ΔU is not limited herein.

In a possible implementation, after obtaining the second direct current bus voltage reference value based on the first direct current bus voltage reference value and the preset first rising gradient value, the method further includes: performing a power grid disconnection operation on the inverter when the inverter meets a power grid disconnection feature. In the foregoing solution, the controller may further detect whether the inverter meets the power grid disconnection feature. When the inverter meets the power grid disconnection feature, the controller performs the power grid disconnection operation on the inverter. Therefore, this solution is applicable to a power grid disconnection scenario of the inverter. The power grid disconnection feature may include: a peak value of the power grid voltage is high, a power grid frequency fluctuates, and continuous over-modulation occurs.

In a possible implementation, after performing the power grid disconnection operation on the inverter, the method further includes: when the inverter meets a preset shutdown protection condition, controlling the inverter to shut down. In the foregoing solution, the shutdown protection condition refers to a determining condition of whether the inverter needs to be shut down for protection. After the controller performs the power grid disconnection operation on the inverter, the controller may determine whether the inverter meets the shutdown protection condition. When the inverter meets the preset shutdown protection condition, the inverter is shut down for protection. In this case, the inverter is shut down under the control of the controller and stops running.

In a possible implementation, after performing the power grid disconnection operation on the inverter, the method further includes: when the inverter does not meet a shutdown protection condition, triggering a step of re-obtaining a power grid voltage. In the foregoing solution, the shutdown protection condition refers to a determining condition of whether the inverter needs to be shut down for protection. After the controller performs the power grid disconnection operation on the inverter, the controller may determine whether the inverter meets the shutdown protection condition. When the inverter does not meet the shutdown protection condition, the step of determining whether the power grid voltage jumps is performed again.

In a possible implementation, the first rising gradient value is $a_1$ V/ms, and V/ms indicates that a unit of a rising gradient value is volts per millisecond. In the foregoing solution, a value of $a_1$ may be reduced, to limit the rising rate of the direct current bus voltage, so that the rising amount of the direct current bus voltage is reduced in the time period for detecting the power grid voltage jump. Therefore, embodiments can be compatible with two scenarios: the high voltage ride through and the power grid disconnection operation moment, to control the direct current bus voltage.

In a possible implementation, $a_1$ satisfies the following relationship: $b<a_1<y/x$, where b represents a saturation speed used to control a direct current bus voltage reference value, y represents a maximum allowable amplitude of the direct current bus voltage, and x represents protection time required for switching overvoltage. In the foregoing solution, the rising gradient value of the direct current bus voltage reference value may be represented as a. For example, a may have a plurality of values such as $a_1$. A value of the rising gradient a V/ms may be set based on a bus voltage reference calculation module in the controller. The bus voltage reference calculation module includes a saturation speed of the controller. It is assumed that a saturation speed of a controller (for example, a PI regulator) of the bus voltage reference calculation module is b V/ms, and protection time required for switching overvoltage is x ms. In this time period, the maximum allowable rising amplitude of the bus voltage is y V, and the value of a satisfies the following relationship: $b<a<y/x$. Therefore, the value of a may be determined according to the foregoing relationship.

In a possible implementation, the method further includes: separately obtaining a peak value of the power grid voltage and a valid value of the power grid voltage; and determining, based on the peak value of the power grid voltage and the valid value of the power grid voltage, whether the power grid voltage jumps. In the foregoing solution, the controller may include a sampling circuit, and a power grid voltage sampling value is obtained by using the sampling circuit, so that the peak value of the power grid voltage and the valid value of the power grid voltage can be calculated, and finally whether the power grid voltage jumps is determined based on the peak value and the valid value that are obtained through calculation, to determine whether the power grid voltage jumps.

In a possible implementation, after obtaining the second direct current bus voltage reference value based on the first direct current bus voltage reference value and the preset first rising gradient value, the method further includes: when the inverter meets a high voltage ride through feature, controlling output power of the inverter to increase. In the foregoing solution, when a power grid voltage jump is detected, a maximum sampling value of the bus voltage in Tres is calculated, and ΔU is added as a bus voltage reference value. If HVRT occurs, a bus voltage raised by the power grid backflow in Tres is sufficient to support subsequent HVRT power output. If the power grid is disconnected, a rising amount of the bus voltage in Tres is still in a proper range, for example, the proper range is that the bus voltage does not reach an overvoltage point. The bus voltage reference value is first increased to ensure functional output, and then a feature is determined to identify HVRT. Feature determining is identifying a power grid disconnection feature or an HVRT feature. For example, feature identification may be obtaining features such as a power grid voltage, a power grid frequency, and a modulation ratio. A feature of the inverter that needs to be obtained is not limited in this embodiment.

According to the foregoing solutions, it can be understood that embodiments have at least the following advantages:

In embodiments, when the power grid voltage jumps, the maximum sampling value of the direct current bus voltage of the inverter is obtained, and the first direct current bus voltage reference value is obtained based on the maximum sampling value of the direct current bus voltage. The direct current bus voltage reference value is greater than or equal to the maximum sampling value of the direct current bus voltage. If high voltage ride through (HVRT) occurs in the inverter, the direct current bus voltage raised by a power grid backflow in the time period for detecting the power grid voltage jump is sufficient to support subsequent HVRT power output. If the inverter is disconnected from the power grid, the second direct current bus voltage reference value is obtained based on the first direct current bus voltage reference value and the preset first rising gradient value. In embodiments, the rising rate of the direct current bus voltage can be limited by using the preset first rising gradient value, so that a rising amount of the direct current bus voltage is reduced in the time period for detecting the power grid voltage jump. Therefore, embodiments can be compatible with two scenarios: high voltage ride through and a power grid disconnection operation moment, to control the direct current bus voltage.

DETAILED DESCRIPTION OF EMBODIMENTS

Embodiments provide a system and method for controlling a direct current bus voltage, to control a direct current bus voltage in a case in which two scenarios of high voltage ride through and a power grid disconnection operation moment are compatible, and control the direct current bus voltage in a proper range.

The following describes embodiments with reference to the accompanying drawings.

In the embodiments and accompanying drawings, the terms "first", "second", and the like are intended to distinguish between similar objects but do not necessarily indicate a specific order or sequence. It should be understood that the terms used in such a way are interchangeable in proper circumstances, which is merely a discrimination manner that is used when objects having a same attribute are described in embodiments. In addition, the terms "include", "have" and any other variants thereof mean to cover the non-exclusive inclusion, so that a process, method, system, product, or device that includes a series of units is not necessarily limited to those units, but may include other units not expressly listed or inherent to such a process, method, product, or device.

Figure 1:
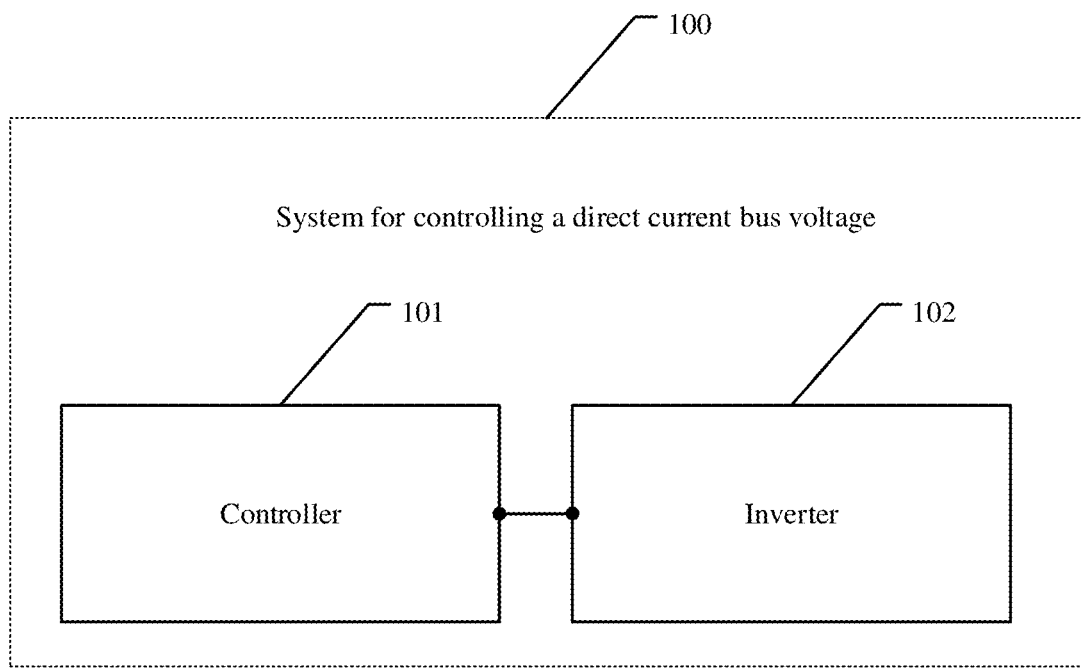
FIG. 1 is a schematic diagram of a composition structure of a system for controlling a direct current bus voltage according to an embodiment.

As shown in FIG. 1, an embodiment provides a system for controlling a direct current bus voltage. The control system 100 includes a controller 101 and an inverter 102.

The controller 101 is connected to the inverter 102.

The controller 101 is configured to: obtain a power grid voltage input by a power grid to the inverter 102, where an output end of the inverter 102 is connected to the power grid; obtain a maximum sampling value of a direct current bus voltage of the inverter 102 when the power grid voltage jumps, where the maximum sampling value of the direct current bus voltage is a maximum voltage value on a direct current bus in a time period for detecting a power grid voltage jump; determine a direct current bus voltage reference value based on the maximum sampling value of the direct current bus voltage, where the direct current bus voltage reference value is greater than or equal to the maximum sampling value of the direct current bus voltage; and obtain a second direct current bus voltage reference value based on the first direct current bus voltage reference value and a preset first rising gradient value, to limit a rising rate of the direct current bus voltage.

The controller 101 provided in this embodiment may be a control apparatus independent of the inverter 102, or the controller 101 may be a control unit in the inverter 102. This is not limited herein.

The inverter 102 provided in this embodiment may be a photovoltaic inverter. For example, the inverter may be a photovoltaic grid-connected inverter. The inverter 102 may include at least two converters. For example, the inverter 102 may include a direct-current/direct-current converter (DC/DC) and a direct-current/alternating-current converter (DC/AC). For example, the DC/DC converter in this embodiment may include, but is not limited to, an asymmetric half-bridge flyback converter, an asymmetric half-bridge forward converter, an LLC resonant converter, and the like.

It can be understood from the description of the system for controlling a direct current bus voltage in the foregoing embodiment that, when the power grid voltage jumps, the maximum sampling value of the direct current bus voltage of the inverter is obtained, and the first direct current bus voltage reference value is obtained based on the maximum sampling value of the direct current bus voltage. The direct current bus voltage reference value is greater than or equal to the maximum sampling value of the direct current bus voltage. If high voltage ride through (HVRT) occurs in the inverter, a direct current bus voltage raised by a power grid backflow in the time period for detecting the power grid voltage jump is sufficient to support subsequent HVRT power output. If the inverter is disconnected from the power grid, the second direct current bus voltage reference value is obtained based on the first direct current bus voltage reference value and the preset first rising gradient value, to limit the rising rate of the direct current bus voltage, so that a rising amount of the direct current bus voltage is reduced in the time period for detecting the power grid voltage jump. Therefore, embodiments can be compatible with two scenarios: high voltage ride through and a power grid disconnection operation moment, to control the direct current bus voltage.

Figure 2:
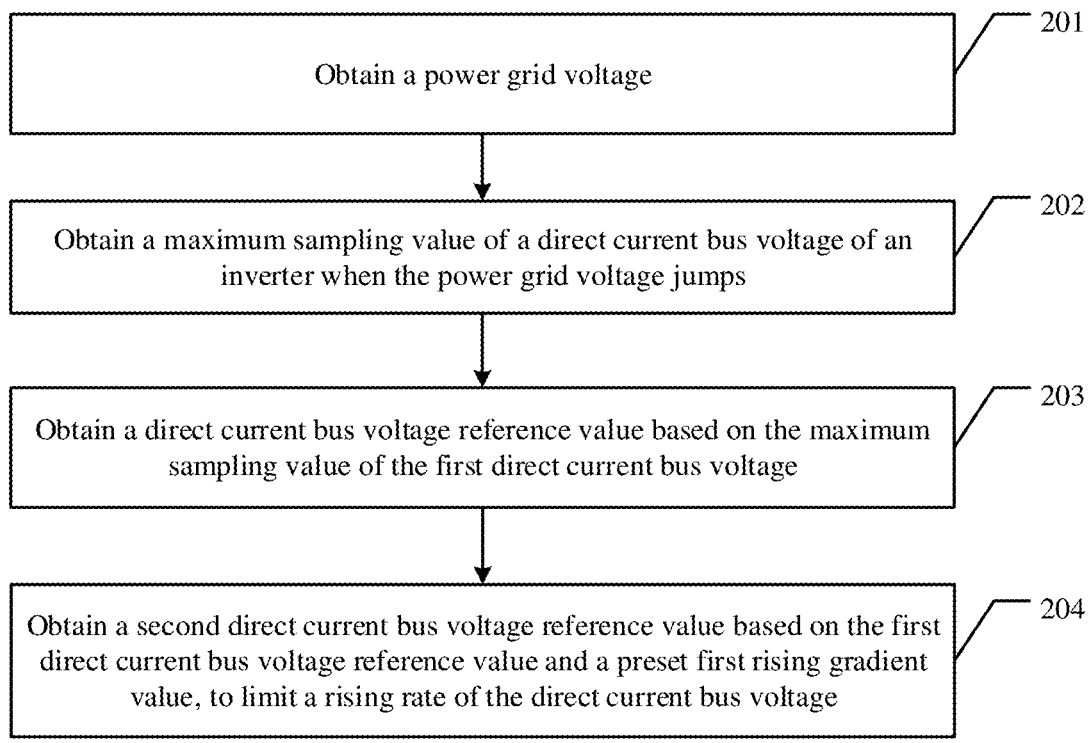
FIG. 2 is a schematic diagram of an implementation of a control function performed by a controller according to an embodiment.

The following describes a function for controlling a direct current bus voltage performed by a controller in an embodiment. Referring to FIG. 2, the controller provided in this embodiment is configured to:

201: Obtain a power grid voltage, where an output end of an inverter is connected to a power grid, and an input end of the inverter is connected to a photovoltaic module through a direct current bus.

For example, the controller may be a control apparatus independent of the inverter, or the controller may be a control unit in the inverter. Additionally, the controller may include a sampling circuit inside the inverter, and sample the power grid voltage by using the sampling circuit. Alternatively, the controller is independent of the inverter, and the controller interacts with the inverter to obtain the power grid voltage.

In this embodiment, the output end of the inverter is connected to the power grid, the input end of the inverter is connected to the photovoltaic module through the direct current bus, the photovoltaic (PV) module is used as a direct current source, and a grid-side switch may be disposed between the output end and the power grid. When the inverter works normally in a grid-connected mode, the grid-side switch may be disconnected, and an alternating current-side power grid is suddenly disconnected.

202: Obtain a maximum sampling value of a direct current bus voltage of the inverter when the power grid voltage jumps, where the maximum sampling value of the direct current bus voltage is a maximum voltage value on the direct current bus in a time period for detecting a power grid voltage jump.

After the controller obtains the power grid voltage, the controller may determine whether the power grid voltage jumps. The controller may obtain the maximum sampling value of the direct current bus voltage of the inverter when the power grid voltage jumps. The maximum sampling value of the direct current bus voltage is the maximum voltage on the direct current bus in the time period for detecting the power grid voltage jump. For example, the time period for detecting the power grid voltage jump is represented as Tres. A specific value of Tres and a start time point of Tres are not limited herein. Subsequently, the direct current bus voltage may alternatively be referred to as a bus voltage.

In some embodiments, the controller is further configured to:
separately obtain a peak value of the power grid voltage and a valid value of the power grid voltage; and
determine, based on the peak value of the power grid voltage and the valid value of the power grid voltage, whether the power grid voltage jumps.

The controller may include a sampling circuit, and a power grid voltage sampling value is obtained by using the sampling circuit, so that the peak value of the power grid voltage and the valid value of the power grid voltage can be calculated, and finally whether the power grid voltage jumps is determined based on the peak value and the valid value that are obtained through calculation, to determine whether the power grid voltage jumps.

203: Obtain a first direct current bus voltage reference value based on the maximum sampling value of the direct current bus voltage, where the first direct current bus voltage reference value is greater than or equal to the maximum sampling value of the direct current bus voltage.

After obtaining the maximum sampling value of the direct current bus voltage, the controller obtains the first direct current bus voltage reference value based on the maximum sampling value of the direct current bus voltage, provided that the first direct current bus voltage reference value is greater than or equal to the maximum sampling value of the direct current bus voltage. A specific value of the first direct current bus voltage reference value is not limited herein.

In some embodiments, the maximum sampling value of the direct current bus voltage is used as a base value, the base value is adjusted based on a preset voltage amplitude threshold, and a voltage value obtained after adjustment is used as the first direct current bus voltage reference value. The first direct current bus voltage reference value is greater than or equal to the maximum sampling value of the direct current bus voltage. A specific value of the first direct current bus voltage reference value is not limited herein.

In some embodiments, the obtaining a first direct current bus voltage reference value based on the maximum sampling value of the direct current bus voltage includes:
adjusting the maximum sampling value of the direct current bus voltage based on a preset voltage amplitude threshold, to obtain the first direct current bus voltage reference value.

In this embodiment, the controller may quickly increase the maximum sampling value of the direct current bus voltage when the power grid voltage jumps, to obtain the first direct current bus voltage reference value, so that the direct current bus voltage can be quickly increased.

In some embodiments, the adjusting the maximum sampling value of the direct current bus voltage based on a preset voltage amplitude threshold, to obtain the first direct current bus voltage reference value includes:
obtaining the first direct current bus voltage reference value in the following manner:

$$U_{BUS\text{-}R}=U_{BUS\text{-}MAX}+\Delta U, \text{ where}$$

$U_{BUS\text{-}R}$ represents the first direct current bus voltage reference value, $U_{BUS\text{-}MAX}$ represents the maximum sampling value of the direct current bus voltage, and $\Delta U$ represents the voltage amplitude threshold.

It should be noted that the voltage amplitude threshold may be represented as $\Delta U$, and a value of $\Delta U$ may be determined with reference to an application scenario. A manner of obtaining the value of $\Delta U$ is not limited herein.

In some embodiments, the controller is further configured to:
determine the voltage amplitude threshold based on a direct current bus voltage value that needs to be used when the inverter performs high voltage ride through.

The voltage amplitude threshold may be used to adjust the maximum sampling value of the direct current bus voltage to obtain the first direct current bus voltage reference value. The voltage amplitude threshold is determined based on the direct current bus voltage value that needs to be used when the inverter performs high voltage ride through. If the maximum sampling value of the direct current bus voltage cannot meet the direct current bus voltage value that needs to be used when the inverter performs high voltage ride through, the voltage amplitude threshold needs to be set to a large value. If the maximum sampling value of the direct current bus voltage can meet or approaches the direct current bus voltage value that needs to be used when the inverter performs high voltage ride through, the voltage amplitude threshold needs to be set to a small value or zero.

In some embodiments, the voltage amplitude threshold is a voltage value greater than or equal to 0.

The voltage amplitude threshold may be represented as $\Delta U$, and a value of $\Delta U$ may be greater than or equal to 0. For example, it needs to be ensured that a raised direct current bus voltage reference value can meet the voltage value that needs to be used during HVRT. After a normal power grid voltage jumps, bus voltage backflow occurs for a short time, for example, energy of the power grid is backflowed to the direct current bus, causing a passive rise of the bus voltage. In a case in which an actual value of the passively raised bus voltage is sufficient for HVRT use, a value of $\Delta U$ is set. In this case, $\Delta U$ is equal to 0. If the maximum sampling value of the direct current bus voltage is not sufficient for the voltage value used during HVRT, $\Delta U$ needs to be greater than 0, so that the direct current bus voltage reference value can meet the voltage value used during HVRT. A specific value of $\Delta U$ is not limited herein.

204: Obtain a second direct current bus voltage reference value based on the first direct current bus voltage reference value and a preset first rising gradient value, to limit a rising rate of the direct current bus voltage.

After obtaining the first direct current bus voltage reference value at a current moment, the controller may further obtain a direct current bus voltage reference value at another moment after the current moment based on the first direct current bus voltage reference value and the preset rising gradient value. For example, a rising gradient value of a direct current bus voltage reference value is preset at each moment, and a value of the rising gradient value is decreased. Reducing the rising gradient value of the direct current bus voltage reference value may limit the rising rate of the direct current bus voltage, so that the direct current bus voltage rises slowly.

In some embodiments, the controller is further configured to:
obtain a third direct current bus voltage reference value based on the second direct current bus voltage reference value and a preset second rising gradient value, where the second rising gradient value is less than the first rising gradient value.

After obtaining the first direct current bus voltage reference value at the current moment, the controller may further sequentially obtain a direct current bus voltage reference value at another moment after the current moment based on the first direct current bus voltage reference value and the preset rising gradient value. For example, a rising gradient value of a direct current bus voltage reference value is preset at each moment, and a change trend of the rising gradient value is sequentially decreasing. Reducing the rising gradient value of the direct current bus voltage reference value may limit the rising rate of the direct current bus voltage, so that the direct current bus voltage rises slowly.

For example, the first direct current bus voltage reference value is obtained at the current moment, the second direct current bus voltage reference value at a next moment is obtained based on the first direct current bus voltage reference value and the preset first rising gradient value, the second direct current bus voltage reference value is obtained at the next moment, and the third direct current bus voltage reference value at a next moment of the next moment is obtained based on the second direct current bus voltage reference value and the preset second rising gradient value. The second rising gradient value is less than the first rising gradient value. Therefore, in this embodiment, the rising gradient of the bus voltage reference value is set to limit the rising rate of the bus voltage. Because a control value is the bus voltage, a bus voltage actual value is definitely based on the bus voltage reference value. Therefore, the rising rate of the bus voltage actual value can be limited by limiting the rising gradient of the reference value.

It should be noted that the direct current bus voltage reference value may alternatively be referred to as a bus voltage reference value, or a lower limit of a bus voltage reference value.

In some embodiments, after obtaining the second direct current bus voltage reference value based on the first direct current bus voltage reference value and the preset first rising gradient value, the controller is further configured to:
perform a power grid disconnection operation on the inverter when the inverter meets a power grid disconnection feature.

The controller may further detect whether the inverter meets the power grid disconnection feature. When the inverter meets the power grid disconnection feature, the controller performs the power grid disconnection operation on the inverter. Therefore, this solution is applicable to a power grid disconnection scenario of the inverter. The power grid disconnection feature may include: a peak value of the power grid voltage is high, a power grid frequency fluctuates, and continuous over-modulation occurs.

In this embodiment, a rise of an alternating current port voltage can be suppressed by limiting the rising rate of the bus voltage. For example, modulation is performed based on a fixed modulation ratio, and a lower bus voltage indicates a lower modulated alternating current port voltage. In addition, it can be ensured that a bus voltage rise is limited before the power grid disconnection feature is detected and identified, to gain time for a protection action.

In some embodiments, after performing the power grid disconnection operation on the inverter, the controller is further configured to:
when the inverter meets a preset shutdown protection condition, control the inverter to shut down.

The shutdown protection condition refers to a determining condition of whether the inverter needs to be shut down for protection. After the controller performs the power grid disconnection operation on the inverter, the controller may determine whether the inverter meets the shutdown protection condition. When the inverter meets the preset shutdown protection condition, the inverter is shut down for protection. In this case, the inverter is shut down under the control of the controller and stops running.

In some embodiments, after performing the power grid disconnection operation on the inverter, the controller is further configured to:
when the inverter does not meet a shutdown protection condition, trigger a step 201 of re-obtaining a power grid voltage.

The shutdown protection condition refers to a determining condition of whether the inverter needs to be shut down for protection. After the controller performs the power grid disconnection operation on the inverter, the controller may determine whether the inverter meets the shutdown protection condition. When the inverter does not meet the shutdown protection condition, step 201 to step 204 are performed again.

In some embodiments, the first rising gradient value is $a_1$ V/ms, and V/ms indicates that a unit of a rising gradient value is volts per millisecond.

In some embodiments, the first rising gradient value is $a_1$ V/ms, the second rising gradient value is $a_2$ V/ms, and $a_1$ and $a_2$ satisfy the following relationship: $a_2 < a_1$, where V/ms indicates that a unit of the rising gradient value is volts per millisecond. In the foregoing solution, the second rising gradient value is less than the first rising gradient value, so that a rising amount of the direct current bus voltage is reduced in the time period for detecting the power grid voltage jump. Therefore, embodiments can be compatible with two scenarios: the high voltage ride through and the power grid disconnection operation moment, to control the direct current bus voltage.

The rising gradient value of the direct current bus voltage reference value may be represented as a. For example, a may include a plurality of values such as $a_1$ and $a_2$. The controller may reduce the rising gradient value of the direct current bus voltage reference value, and a current rising gradient value obtained after reduction is a V/ms, where a represents a specific rising gradient value, and V/ms is a unit of gradient.

In some embodiments, $a_1$ meets the following relationship: $b < a_1 < y/x$.

In some embodiments, $a_1$ and $a_2$ respectively meet the following relationships: $b < a_1 < y/x$; and $b < a_2 < y/x$, where b represents a saturation speed used to control a direct current bus voltage reference value, y represents a maximum allowable amplitude of the direct current bus voltage, and x represents protection time required for switching overvoltage.

For example, the rising gradient value of the direct current bus voltage reference value may be represented a. For example, a may have a plurality of values such as, $a_1$ and $a_2$. A value of the rising gradient a V/ms may be set based on a bus voltage reference calculation module in the controller. The bus voltage reference calculation module includes a saturation speed of the controller. It is assumed that a saturation speed of a controller (for example, a PI regulator)

of the bus voltage reference calculation module is b V/ms, and protection time required for switching overvoltage is x ms. In this time period, the maximum allowable rising amplitude of the bus voltage is y V, and the value of a satisfies the following relationship: b<a<y/x. Therefore, the value of a may be determined according to the foregoing relationship.

In some embodiments, after reducing the rising gradient of the direct current bus voltage reference value, the controller is further configured to:

when the inverter meets a high voltage ride through feature, control output power of the inverter to increase.

When a power grid voltage jump is detected, a maximum sampling value of the bus voltage in Tres is calculated, and ΔU is added as a bus voltage reference value. If HVRT occurs, a bus voltage raised by the power grid backflow in Tres is sufficient to support subsequent HVRT power output. If the power grid is disconnected, a rising amount of the bus voltage in Tres is still in a proper range, for example, the proper range is that the bus voltage does not reach an overvoltage point. The bus voltage reference value is first increased to ensure functional output, and then a feature is determined to identify HVRT. Feature determining is identifying a power grid disconnection feature or an HVRT feature. For example, feature identification may be obtaining features such as a power grid voltage, a power grid frequency, and a modulation ratio. A feature of the inverter that needs to be obtained is not limited in this embodiment.

It should be noted that, in this embodiment, in the time period of Tres, the bus voltage is passively raised, and the power grid voltage suddenly rises, which causes bus backflow. For example, energy of the power grid is backflowed to the direct current bus, which causes the bus voltage to rise. A rising amount of the bus voltage is determined by a sudden increase amount of the power grid voltage. If a sudden increase of the power grid voltage is large, shutdown protection is performed through power grid overvoltage.

It can be understood from the example description in the foregoing embodiment that, when the power grid voltage jumps, the maximum sampling value of the direct current bus voltage of the inverter is obtained, and the first direct current bus voltage reference value is obtained based on the maximum sampling value of the direct current bus voltage. The direct current bus voltage reference value is greater than or equal to the maximum sampling value of the direct current bus voltage. If high voltage ride through (HVRT) occurs in the inverter, a direct current bus voltage raised by a power grid backflow in the time period for detecting the power grid voltage jump is sufficient to support subsequent HVRT power output. If the inverter is disconnected from the power grid, the second direct current bus voltage reference value is obtained based on the first direct current bus voltage reference value and the preset first rising gradient value, to limit the rising rate of the direct current bus voltage, so that a rising amount of the direct current bus voltage is reduced in the time period for detecting the power grid voltage jump. Therefore, embodiments can be compatible with two scenarios: high voltage ride through and a power grid disconnection operation moment, to control the direct current bus voltage.

For better understanding and implementation of the foregoing solutions in embodiments, further descriptions are provided below by using corresponding application scenarios as examples.

The controller provided in this embodiment may be a controller of the inverter. For example, program code of the controller is burnt into a control chip of the inverter. The following describes, by using an example, a process in which a controller controls a bus voltage in this embodiment.

The inverter includes a plurality of switching transistors. In this embodiment ion, an example in which each switching transistor is an insulated gate bipolar transistor (IGBT) is used for description. It should be understood that each switching transistor may alternatively be another semiconductor device such as a metal-oxide-semiconductor field-effect transistor (MOSFET).

When an inverter is disconnected from a power grid, a bus voltage rise needs to be suppressed, to ensure that a direct current bus voltage is in a proper range from power grid disconnection to a protection stage. However, during high voltage ride through, the direct current bus voltage needs to be quickly raised, to ensure that an active current or a reactive current is output in specified time. Currently, there is no controller that can be compatible with a high voltage ride through scenario and a power grid disconnection scenario. An embodiment provides a controller that can be compatible with the foregoing two scenarios. Details are described below.

The controller in this embodiment is configured to:

when it is detected that a power grid voltage jumps, calculate a maximum sampling value of a bus voltage in Tres, and obtain a bus voltage reference value based on the maximum value.

A rising gradient value of the bus voltage reference value in the controller is set to $a_1$ V/ms, to limit a rising rate of the bus voltage.

For example, after the maximum sampling value of the bus voltage within Tres is calculated, ΔU is added as the bus voltage reference value.

Tres refers to a time period for detecting a power grid voltage jump, and ΔU refers to a difference between an actual bus voltage reference value and the maximum sampling value of the bus voltage in Tres.

V/ms (Volts/millisecond) is a unit of a bus voltage gradient, and a rising gradient value of the direct current bus voltage reference value may be represented as $a_1$. In this embodiment, the rising gradient of the bus voltage reference value is set to limit the rising rate of the bus voltage. Because a control value is the bus voltage, a bus voltage actual value is based on the bus voltage reference value. Therefore, the rising rate of the bus voltage actual value can be limited by limiting the rising gradient of the bus voltage reference value.

In this embodiment, there are two purposes of limiting the rising rate of the bus voltage: one is to suppress rise of an alternating current port voltage (modulation is performed based on a fixed modulation ratio, and a lower bus voltage indicates a lower modulated alternating current port voltage); and the other is to ensure that the bus voltage rise is limited before a power grid disconnection feature is detected and identified, to gain time for a protection action.

In this embodiment, when a power grid voltage jump is detected, a maximum sampling value of the bus voltage in Tres is calculated, and ΔU is added as a bus voltage reference value. If HVRT occurs, a bus voltage raised by the power grid backflow in Tres is sufficient to support subsequent HVRT power output. If the power grid is disconnected, a rising amount of the bus voltage in Tres is still in a proper range. The bus voltage reference value is first increased to ensure functional output, and then a feature is determined to identify the HVRT or power grid disconnection feature.

Figure 3:
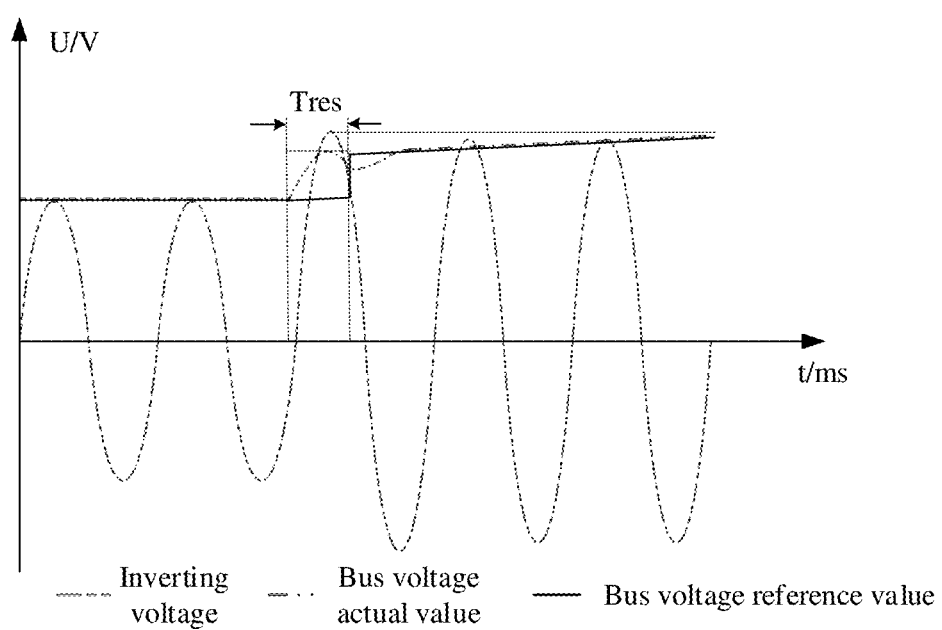
FIG. 3 is a schematic diagram of a change relationship between a direct current bus voltage actual value and a direct current bus voltage reference value according to an embodiment.

As shown in FIG. 3, a bus voltage actual value changes with a bus voltage reference value, and the bus voltage reference value is quickly raised in Tres. A rising gradient of the bus voltage reference value in the controller is set to $a_1$V/ms, to limit the rising rate of the bus voltage. The rising gradient is set to slow down a positive feedback rate, reduce impact of feedforward of the power grid voltage, and ensure that the bus voltage rise is limited before the power grid disconnection feature is detected and identified, to gain time for a protection action. The positive feedback is a relationship between a bus voltage and an alternating current port voltage. After the bus voltage rises, the alternating current port voltage rises, and after the alternating current port voltage rises, the bus voltage further rises.

It should be noted that, in this embodiment, the rising gradient and the rising rate have similar meanings. A quantization scale is calibrated for the rising rate by using the rising gradient. A unit of the rising gradient is V/ms. A larger gradient value indicates a higher rising rate.

Figure 4:
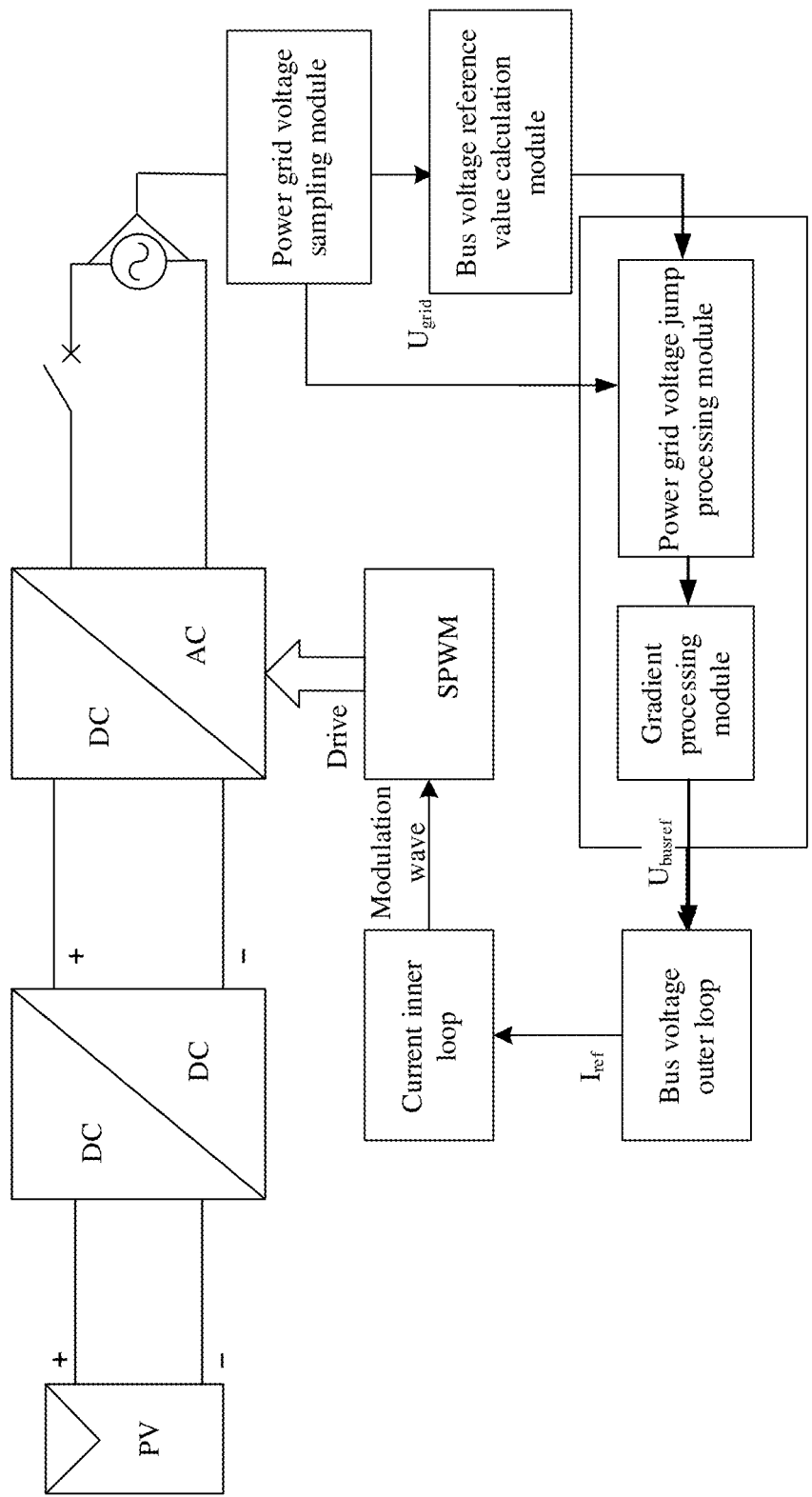
FIG. 4 is a schematic diagram of a composition structure of a two-stage inverter according to an embodiment.

The following describes an application scenario of this embodiment, that is, a power grid disconnection scenario. As shown in FIG. 4, a two-stage inverter may include a DC/DC converter and a DC/AC converter. A photovoltaic (PV) module is connected to the DC/DC converter as a direct current source, the DC/DC converter is connected to the DC/AC converter, and the DC/AC converter is connected to a power grid by using a switch. When an inverter works normally in a grid-connected mode, an alternating current-side power grid is suddenly disconnected.

A PV module consists of several PV modules connected in series. The PV modules are connected to a direct current bus through the DC/DC converter, and then feed energy to the power grid through the DC/AC converter.

The controller may include the following modules: a power grid voltage sampling module, a bus voltage reference calculation module, a power grid voltage jump processing module, a gradient processing module, a bus voltage outer loop, a current inner loop, and sine pulse width modulation (SPWM).

The power grid voltage sampling module is configured to sample a voltage of the power grid to obtain a power grid voltage, for example, the power grid voltage is U g rid, and send the power grid voltage to the power grid voltage jump processing module.

The bus voltage reference calculation module is configured to calculate a direct current bus voltage reference value.

The power grid voltage jump processing module is configured to determine whether the power grid voltage jumps.

The gradient processing module is configured to set a rising gradient value of a bus voltage reference value in the controller to $a_1$V/ms, to limit a rising rate of the bus voltage, for example, output the bus voltage reference value as $U_{busref}$.

The bus voltage outer loop is configured to control a direct current bus voltage, and output a current reference value, for example, the current reference value is $I_{ref}$.

The current inner loop is configured to control a grid-connected current and output a modulated wave.

The SPWM is configured to generate a drive signal based on the modulated wave output by the current inner loop, and input the drive signal to the DC/AC converter.

When a power grid disconnection operation is performed, the inverter cannot output a specified current, and the modulation wave output by the current inner loop continuously increases in an integral manner, resulting in a continuous increase of a voltage modulation ratio. To reduce the modulation ratio, the DC/AC converter continuously increases the bus voltage, and further causes an increase of a modulated inverter port voltage. Increasing a switch tube has a risk of stress, which affects safety of device running. The current inner loop refers to a control loop in the controller.

When the power grid voltage jump is detected, a maximum sampling bus voltage value in Tres is calculated, and ΔU is added as the bus voltage reference value to quickly increase the bus voltage reference value. The bus voltage reference value in the controller is set to $a_1$V/ms, which limits the rising rate of the bus voltage and ensures that the bus voltage rise is limited before the power grid disconnection feature is detected and identified, to gain time for power grid fault identification and protection action.

Figure 5:
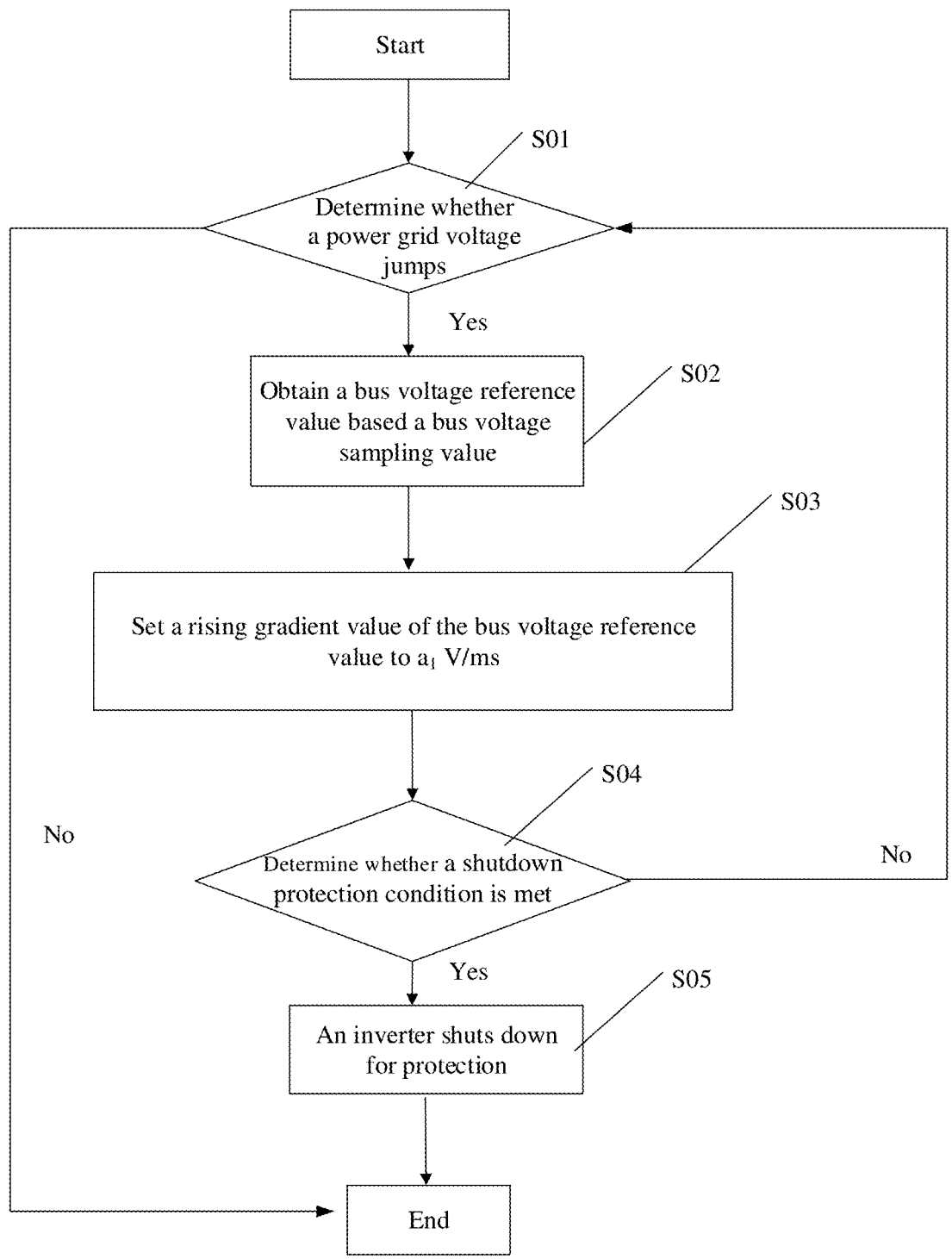
FIG. 5 is a schematic diagram of an application scenario of a control function of a controller according to an embodiment.

As shown in FIG. 5, an application scenario provided in an embodiment includes the following steps:

S01: An inverter determines whether a current power grid voltage jumps, and enters S02 if the current power grid voltage jumps.

S02: Detect a maximum sampling value of a bus voltage in Tres, and add ΔU as a reference value of the current bus voltage to quickly increase a bus voltage reference value.

The bus reference is first raised to ensure functional output of the inverter, and then a feature is determined, to identify HVRT or power grid disconnection. When the power grid voltage jump is detected, an actual bus voltage raised by bus backflow is directly used as a bus voltage control reference, without identifying whether the power grid is disconnected or HVRT occurs. In this case, the bus voltage can meet a requirement of high voltage ride through, and the voltage is not too high.

S03: Set a rising gradient value of the bus voltage reference value to $a_1$V/ms, to limit a rising rate of the bus voltage.

S04: The inverter enters subsequent power grid disconnection feature identification logic determining, and determines whether a power grid disconnection operation is identified a shutdown protection condition is met; and enters S05 if the shutdown protection condition is met.

The power grid disconnection feature may include: a peak value of the power grid voltage is high, a power grid frequency fluctuates, and continuous over-modulation occurs. The inverter shutdown protection condition is that an alarm is generated. Different alarms for shutdown are reported based on the bus voltage actual value and a variable feature inside the controller.

S05: The inverter shuts down for protection and stops running.

In this embodiment, high voltage ride through and power grid disconnection scenarios can be compatible. When the power grid voltage jump is detected, the maximum sampling value of the bus voltage in Tres is calculated, and ΔU is added as the bus voltage reference value. If HVRT occurs, the bus voltage raised by the power grid backflow in Tres is sufficient to support subsequent HVRT power output. If the power grid is disconnected, a rising amount of the bus voltage in Tres is still in a proper range. Therefore, the two scenarios are compatible.

In this embodiment, the rising rate of the bus voltage is slow, and a stress risk of an IGBT module is reduced. The rising gradient of the bus voltage reference value in the controller is set to $a_1$V/ms, to limit the rising rate of the bus voltage. The gradient is added to reduce a positive feedback rate, reduce impact of power grid feedforward, and ensure that the bus voltage rise is limited before power grid disconnection feature is detected and identified, to gain time for a protection action, and reduce the stress risk of the IGBT module.

It should be noted that, for ease of description, the foregoing embodiments are represented as a series of actions. However, a person skilled in the art should appreciate that the embodiments are not limited to the described order of the actions, because according to the embodiments, some steps may be performed in another order or simultaneously. It should be further appreciated by a person skilled in the art that the embodiments all belong to example embodiments, and the involved actions and modules are not necessarily required.

An implementation type of a switching transistor is not limited in the embodiments, and the switching transistor can be a controllable switching transistor, for example, a metal-oxide-semiconductor field-effect transistor, or an insulated gate bipolar transistor.

It should be noted that the terms "first" and "second" in the embodiments and the accompanying drawings are merely used for description purposes, and are not construed as indicating or implying relative importance. The terms "first" and "second" are used to distinguish between similar objects, and do not need to be used to describe a specific order or sequence. It should be understood that the terms used in such a way are interchangeable in proper circumstances, which is merely a discrimination manner that is used when objects having a same attribute are described in embodiments. In addition, the terms "include", "contain" and any other variants mean to cover the non-exclusive inclusion, so that a process, method, system, product, or device that includes a series of units is not necessarily limited to those units, but may include other units not expressly listed or inherent to such a process, method, system, product, or device.

In the embodiments, "at least one" means one or more, and "plurality" means two or more. The term "and/or" is used for describing an association relationship between associated objects, and represents that three relationships may exist. For example, "A and/or B" may represent the following three cases: only A exists, only B exists, and both A and B exist, where A and B may be singular or plural. The character "/" generally indicates an "or" relationship between the associated objects. "At least one of the following items (pieces)" or a similar expression thereof refers to any combination of these items, including any combination of singular items (pieces) or plural items (pieces). For example, at least one of a, b, or c may indicate a, b, c, "a and b", "a and c", "b and c", or "a, b, and c", where a, b, and c may be singular or plural.

All functional units in embodiments may be integrated into one processing unit, each unit may be separately used as one unit, or two or more units may be integrated into one unit. The integrated units may be implemented in a form of hardware, or may be implemented in a form of a hardware and software functional unit.

The foregoing descriptions are merely example embodiments, but are not intended as limiting in any form. By using the method and the content above, any persons of ordinary skill in the art can make a plurality of possible changes and modifications on the solutions of the embodiments, or amend the solutions thereof to be embodiments with equal effects through equivalent variations without departing from the scope of the solutions of the embodiments. Therefore, any amendment, equivalent variation, and modification made on the above embodiments without departing from the content of the solutions of the embodiments shall fall within their scope.

What is claimed is:

1. A system for controlling a direct current bus voltage, comprising:
   a controller; and
   an inverter that has an output end and an input end, wherein
   the output end of the inverter is connected to a power grid, and the input end of the inverter is connected to a photovoltaic module through a direct current bus; and
   the controller is configured to:
      obtain a power grid voltage;
      obtain a maximum sampling value of a direct current bus voltage of the inverter when the power grid voltage jumps, wherein the maximum sampling value of the direct current bus voltage is a maximum voltage value on the direct current bus in a time period for detecting a power grid voltage jump;
      obtain a first direct current bus voltage reference value based on the maximum sampling value of the direct current bus voltage, wherein the first direct current bus voltage reference value is greater than or equal to the maximum sampling value of the direct current bus voltage; and
      obtain a second direct current bus voltage reference value based on the first direct current bus voltage reference value and a preset first rising gradient value, to limit a rising rate of the direct current bus voltage.

2. The system according to claim 1, wherein the controller is further configured to:
   obtain a third direct current bus voltage reference value based on the second direct current bus voltage reference value and a preset second rising gradient value, wherein the second rising gradient value is less than the first rising gradient value.

3. The system according to claim 1, wherein the controller is further configured to:
   adjust the maximum sampling value of the direct current bus voltage based on a preset voltage amplitude threshold to obtain the first direct current bus voltage reference value.

4. The system according to claim 3, wherein the controller is further configured to:
   obtain the first direct current bus voltage reference value using:

$U_{BUS-R} = U_{BUS-MAX} + \Delta U$, wherein $U_{BUS-R}$ represents the first direct current bus voltage reference value, $U_{BUS-MAX}$ represents the maximum sampling value of the direct current bus voltage, and $\Delta U$ represents the voltage amplitude threshold.

5. The system according to claim 3 wherein the controller is further configured to:
   determine the voltage amplitude threshold based on a direct current bus voltage value that needs to be used when the inverter performs high voltage ride through.

6. The system according to claim 3, wherein the voltage amplitude threshold is a voltage value greater than or equal to 0.

7. The system according to claim 1, wherein, after obtaining the second direct current bus voltage reference value based on the first direct current bus voltage reference value and the preset first rising gradient value, the controller is further configured to:

perform a power grid disconnection operation on the inverter when the inverter meets a power grid disconnection feature.

8. The system according to claim 7, wherein, after performing the power grid disconnection operation on the inverter, the controller is further configured to:
when the inverter meets a preset shutdown protection condition, control the inverter to shut down.

9. The system according to claim 7, wherein, after performing the power grid disconnection operation on the inverter, the controller is further configured to:
trigger a step of re-obtaining a power grid voltage when the inverter does not meet a shutdown protection condition.

10. The system according to claim 1, wherein the first rising gradient value is $a_1$ V/ms; and
V/ms indicates that a unit of a rising gradient value is volts per millisecond.

11. The control system according to claim 10, wherein $a_1$ satisfies the following relationship:

$b < a_1 < y/x$, wherein b represents a saturation speed used to control a direct current bus voltage reference value, y represents a maximum allowable amplitude of the direct current bus voltage, and x represents protection time required for switching overvoltage.

12. The system according to claim 1, wherein the controller is further configured to:
separately obtain a peak value of the power grid voltage and a valid value of the power grid voltage; and
determine, based on the peak value of the power grid voltage and the valid value of the power grid voltage, whether the power grid voltage jumps.

13. The system according to claim 1, wherein after obtaining the second direct current bus voltage reference value based on the first direct current bus voltage reference value and the preset first rising gradient value, the controller is further configured to:
when the inverter meets a high voltage ride through feature, control output power of the inverter to increase.

14. A method for controlling a direct current bus voltage, wherein the method is used to control an inverter, an output end of the inverter is connected to a power grid, an input end of the inverter is connected to a photovoltaic module through a direct current bus, and the method comprises:
obtaining a power grid voltage;
obtaining a maximum sampling value of a direct current bus voltage of the inverter when the power grid voltage jumps, wherein the maximum sampling value of the direct current bus voltage is a maximum voltage value on the direct current bus in a time period for detecting a power grid voltage jump;
obtaining a first direct current bus voltage reference value based on the maximum sampling value of the direct current bus voltage, wherein the first direct current bus voltage reference value is greater than or equal to the maximum sampling value of the direct current bus voltage; and
obtaining a second direct current bus voltage reference value based on the first direct current bus voltage reference value and a preset first rising gradient value, to limit a rising rate of the direct current bus voltage.

15. The method according to claim 14, further comprising:
obtaining a third direct current bus voltage reference value based on the second direct current bus voltage reference value and a preset second rising gradient value, wherein the second rising gradient value is less than the first rising gradient value.

16. The method according to claim 14, wherein obtaining the first direct current bus voltage reference value based on the maximum sampling value of the direct current bus voltage comprises:
adjusting the maximum sampling value of the direct current bus voltage based on a preset voltage amplitude threshold to obtain the first direct current bus voltage reference value.

17. The method according to claim 16, wherein adjusting the maximum sampling value of the direct current bus voltage based on the preset voltage amplitude threshold to obtain the first direct current bus voltage reference value comprises:
obtaining the first direct current bus voltage reference value using:

$U_{BUS-R} = U_{BUS-MAX} + \Delta U$, wherein $U_{BUS-R}$ represents the first direct current bus voltage reference value, $U_{BUS-MAX}$ represents the maximum sampling value of the direct current bus voltage, and $\Delta U$ represents the voltage amplitude threshold.

18. The method according to claim 16, wherein the voltage amplitude threshold is a voltage value greater than or equal to 0.

19. The method according to claim 14, wherein the first rising gradient value is $a_1$ V/ms; and
V/ms indicates that a unit of a rising gradient value is volts per millisecond.

20. The method according to claim 19, wherein $a_1$ satisfies the following relationship:

$b < a_1 < y/x$, wherein b represents a saturation speed used to control a direct current bus voltage reference value, y represents a maximum allowable amplitude of the direct current bus voltage, and x represents protection time required for switching overvoltage.

* * * * *